United States Patent Office 3,412,193
Patented Nov. 19, 1968

3,412,193
11 - (4 - METHYL - 1 - PIPERAZINYL)DIBENZ[b,f] [1,4]OXAZEPINES OR THIAZEPINES FOR CONTROLLING FERTILITY
John Anthony Coppola, Spring Valley, N.Y., assignor to American Cyanamid Company, Stamford, Conn., a corporation of Maine
No Drawing. Filed Dec. 13, 1965, Ser. No. 513,553
4 Claims. (Cl. 424—250)

ABSTRACT OF THE DISCLOSURE

Compositions containing 2-chloro (or hydrogen) 11-(4-methyl-1-piperazinyl)dibenz[b,f][1,4]oxazepines or thiazepines are described. They are useful for controlling fertility in warm-blooded animals.

It has been found that compositions containing as the active component a compound of the formula:

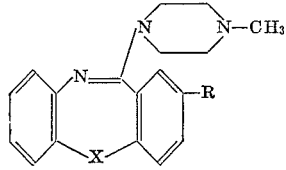

wherein R is selected from the group consisting of hydrogen and halogen and X is selected from the group consisting of oxygen and sulfur are active anti-fertility agents in warm blooded animals. The above described active components form a part of novel compositions containing a pharmaceutically acceptable carrier.

Among the compounds within the scope of the present invention are, for example, 11-(4-methyl-1-piperazinyl)-dibenz[b,f][1,4]oxazepine;
2-chloro-11-(4-methyl-1-piperazinyl)-dibenz[b,f][1,4] oxazepine;
2-bromo-11-(4-methyl-1-piperazinyl)-dibenz[b,f][1,4] oxazepine;
2-iodo-11-(4-methyl-1-piperazinyl)-dibenz[b,f][1,4] oxazepine;
2-fluoro-11-(4-methyl-1-piperazinyl)-dibenz[b,f][1,4] oxazepine;
11-(4-methyl-1-piperazinyl)-dibenz[b,f][1,4]thiazepine;
2-chloro-11-(4-methyl-1-piperazinyl)-dibenz[b,f][1,4] thiazepine;
2-bromo-11-(4-methyl-1-piperazinyl)-dibenzo[b,f][1,4] thiazepine;
2-iodo-11-(4-methyl-1-piperazinyl)-dibenzo[b,f][1,4] thiazepine;
2-fluoro-11-(4-methyl-1-piperazinyl)-dibenzo[b,f][1,4] thiazepine.

The compositions of this invention provide a convenient mode of contraception throughout the use of an orally administered composition without inducing permanent reproductive sterility. It has been found that when compositions containing the above described active components were orally administered at dosages described hereinafter for 10 days to adult female rats which were cohabited with fertile male rats, pregnancy was prevented in all instances. Moreover, no accompanying maternal lethality was observed.

Accordingly, this invention includes within its scope the new compositions of matter for the control of mammalian female sexual reproduction and to methods of their administration. It is indicated that the favorable results achieved in rats with these compositions will relate to similar effects in other mammals as well. The novel compositions, therefore, are potentially useful for the control of female sexual reproduction in warm blooded animals including domestic animals and pests as, for example, rats, weasels, foxes and the like.

There are several points of contraceptive attack during the normal processes of mammalion female reproduction. These points include ovulation blockade, interference with the fertilization of the ovum by sperm, interference with the normal transport of ova and/or zygotes in the reproductive tract, prevention of embryo implantation, disruption of the maternal response to embryonic implantation, and maternal failure to support embryonic survival. While the exact mechanism or mechanisms which take place with the active ingredient in effecting contraception is not clear, it is known that the compositions of this invention prevent conception by one or more of the above-mentioned occurrences. It is not intended, however, that the present invention be limited to any particular theory as to mechanism of contraception.

While the method of administering the active component of the novel therapeutic compositions of the present invention is not limited to oral administration alone, a decided practical advantage of the invention is that the active ingredient may be administered orally in any convenient manner. This however, does not preclude the use of the present compositions intraperitoneally or by other non-oral means. The compound, preferably, may be taken orally, for example, with an inert diluent or with an assimilable edible carrier, or by use of a pharmaceutically acceptable carrier compressed into tablets, or enclosed in hard or soft gelatin capsules. Other compositions include for example, suspensions, syrups, elixirs, emulsions, wafers, or the like. Obviously, in addition to the therapeutic active ingredient there may be present excipients, binders, fillers and other inert ingredients necessary in the formulation of the desired pharmaceutical compositions. Preferred compositions or preparations according to the present invention are prepared so that a dosage unit form contains between about 10.0 milligrams and about 250 milligrams of the active component. These dosage unit forms may be administered one or more times per day during the period anti-fertility effect is desired.

The amount of a single dose or of a daily dose to produce the desired level of efficacy should be such as to give a proportionate dosage of from about 0.3 mg. to 30 mg./kg./day of active component. In terms of total weight of active component the daily dosage for warm blooded animals of, for example, 60 kilograms would amount to from about 18 mg. to 180 mg. The dosage regimen may be adjusted to provide optimum response with the least amount of active ingredient.

The following examples illustrate preparation of active components and the method of administering the novel compositions of this invention and their anti-fertility effect in female rats.

Example 1.—Preparation of 11-(4-methyl-1-piperazinyl) dibenz-[b,f][1,4] oxazepine To a cold suspension of 5.8 g. of phosphorus pentachloride in 26 ml. of acetyl chloride, is added, cautiously and in portions, 4.4 g. of xanthone oxime. Hydrogen chloride gas is evolved and the solid initially formed is partially dissolved when the mixture is stirred overnight. After the mixture is stirred for about 12 hours, the acetyl chloride and phosphorus oxychloride are removed by vacuum distillation. A small amount of benzene is added to the residue and the vacuum concentration is repeated. The residual solid, crude 11-chlorodizenz[b,f][1,4]oxazepine, is dissolved in 30 ml. of benzene and this solution is added to a solution of 10 grams of 1-methylpiperazine in 100 ml. of benzene. After being stirred overnight, the mixture is filtered and the filtrate is concentrated to a viscous residue. This residue is dissolved in 100 milliliters of ether and extracted with ice-cold dilute hydrochloric acid. The aqueous layer is made basic with 3N sodium hydroxide and the resulting oil is extracted with 150 milliliters of ether and dried over solid sodium hydroxide. Concentration yields an oil which, when crystallized from petroleum ether gives a colorless solid melting at 97°–98° C.

Example 2.—Preparation of 2-chloro-11-(4-methyl-1-piperazinyl)dibenz[b,f][1,4]oxazepine To a mixture of o-(p-chlorophenoxy)aniline hydrochloride (prepared from 32 g. of the base) in 50 ml. of pyridine is added gradually while heating under reflux, 25 ml. of ethyl chloroformate. After the addition is completed, the mixture is heated under reflux for one hour longer, and then evaporated under reduced pressure to an oily residue. The residue is taken up in 300 ml. of water, and extracted with ether (approximately 200 ml.). The ether extract is separated, dried over sodium sulfate, and evaporated to an oily residue (40 g.) which contains ethyl o-(p-chlorophenoxy) carbanilate and is used without further purification. The crude ethyl o-(p-chlorophenoxy)carbanilate is dissolved in 20 ml. of benzene, and 20 ml. of 1-methylpiperazine and a small amount of sodium methylate (approximately 25–50 mg.) are added. Benzene is then removed by slow distillation; and the mixture is heated overnight under reflux (approximately 16 hours). Evaporation under reduced pressure then gives a solid residue which is dissolved in 400 ml. of ether with heating. Concentrational to half-volume under reduced pressure produces a precipitate which is collected, washed with petoleum ether and dried (36 g.) a second crop of product is isolated from the filtrate. This product is dissolved in 200 ml. of chloroform and treated with an excess of anhydrous hydrogen chloride. The resulting precipitate is collected and dried at 50° C. (in vacuo), and 4-methyl-2'-(p - chlorophenoxy)-1-piperazinecarboxanilide hydrochloride, melting point 210°–213° C., is thereby obtained.

A mixture of 4-methyl-2'-(p-chlorophenoxy)-1-piperazinecarboxanilide hydrochloride (6 g.), 50 ml. of phosphorus oxychloride and 10 g. of phosphorus pentoxide is heated under reflux for about 24 hours, and then concentrated to a gummy residue by evaporation under reduced pressure. This residue is taken up in 150 ml. of ether, 200 g. of ice is added, and the mixture is made basic with concentrated aqueous ammonium hydroxide. The ether layer is separated, dried over potassium hyroxide pellets and evaporated to a solid residue (approximately 4 g.). This crude product is dissolved in 100 ml. of dilute hydrochloric acid, the acid solution is extracted with ether, and the aqueous layer is made basic with sodium hydroxide solution (3N) in the presence of ether (approximately 250 ml.). The ether layer is separated, dried over potassium hydroxide and evaporated to a white solid. Additional purification by repeating the formation of the hydrochloric acid salt and reprecipitation of the base is carried out. When purified in this manner, followed by drying at 80° C. in vacuo over phosphorus pentoxide, 2-chloro - 11-(4-methyl-1-piperazinyl)dibenz[b,f][1,4]oxazepine, melting point 109°–111° C., is obtained.

Example 3.—Preparation of 2-chloro-11-(4-methyl-1-piperazinyl)dibenz[b,f][1,4]thiazepine The general procedure of the preceding example is repeated. By treatment of o-(p-chlorophenylthio)aniline with ethyl chloroformate in pyridine and benzene, followed by isolation of the product, ethyl o-(p-chlorophenylthio) carbanilate is obtained. When purified by recrystallization from ether this product melts at 92°–94° C. The above prepared ethyl o-(p-chlorophenylthio) carbanilate is allowed to react with an excess of 1-methyl piperazine in the presence of a catalytic amount of sodium hydride. After isolation and purification, 4-methyl-2'-(p-chlorophenylthio)-1-piperazinecarboxanilide hydrochloride, melting point 238°–240° C., is obtained. Cyclization of the above described 4-methyl-2'-(p-chlorophenylthio)-1-piperazinecarboxanilide hydrochloride is carried out by heating in phosphorus oxychloride and phosphorus pentoxide. Isolation and purification of the desired cyclization product is then carried out by the methods outlined in Example 2. 2-chloro-11-(4-methyl-1-piperazinyl) dibenz[b, f][1,4]thiazepine, melting point 114°–116° C. is obtained.

Example 4

Adult Wistar strain rats, maintained on a standard diet of laboratory rat pellets and water, ad libitum, were used. Graded doses of 2 - chloro-11-(4-methyl-1-piperazinyl)-dibenz[b,f][1,4]oxazepine were orally administered once daily for ten days to female rats. The composition was composed of propylene glycol and an appropriate amount of active ingredient so that the desired dose was given in a 0.5 ml. volume. Control rats were given propylene glycol without the active ingredients. On the afternoon of the fourth day of treatment, the females were placed with fertile males in a one to one ratio. Four days after the last injection the females were sacrificed and autopsied and uterine fetal implantation sites were counted. Results of this study are given in Table I below.

TABLE I.—ANTI-FERTILITY EFFICACY OF SUBJECT COMPOSITION IN RATS

| Dose, mg./kg./day | No. Rats Pregnant/No. Rats Treated | Average No. Fetuses/Pregnant Rat |
|---|---|---|
| Propylene glycol, control | 15/15 | 14 |
| 30 | 0/6 | 0 |
| 10 | 0/2 | 0 |
| 3 | 0/4 | 0 |
| 1 | 0/4 | 0 |
| 0.3 | 0/2 | 0 |
| 0.1 | 1/2 | 13 |

Example 5

Following the procedure set forth in Example 4 and using 2-chloro - 11(4-methyl-1-piperazinyl)dibenzo[b,f]-[1,4]thiazepine as an anti-fertility agent, the following results were obtained.

TABLE II

| Dose, mg./kg./day | No. Rats Pregnant/No. Rats Treated | Average No. Fetuses/Pregnant Rat |
|---|---|---|
| Control | 4/4 | 12.2 |
| Compound A: | | |
| 3.0 | 0/5 | 0 |
| 1.0 | 2/6 | 14.0 |
| 0.3 | 5/5 | 12.4 |
| 0.1 | 4/5 | 13.2 |

Example 6.—Hard gelatin capsules

Grams
2-chloro-11-(4-methyl - 1 - piperazinyl) - dibenz[b,f][1,4]oxazepine _____ 150
Cornstarch _____ 115
Magnesium stearate, powder _____ 40
Talc _____ 40

The finely divided ingredients are mixed thoroughly and then encapsulated in 1000 two-piece hard gelatin capsules each containing 150 mgs. of 2-chloro-11-(4-methyl-1-piperazinyl)dibenz[b,f][1,4]oxazepine.

Example 7.—Tablets 2000 tablets each containing 180 mgs. of 2-chloro-11(4-methyl - 1 - piperazinyl) - dibenzo[b,f][1,4]thiazepine are prepared from the following ingredients:

| | Gm. |
|---|---|
| 2-chloro-11(4 - methyl - 1 - piperazinyl) - dibenzo[b,f][1,4]thiazepine | 360 |
| Lactose | 180 |
| Starch | 180 |
| Calcium stearate | 36 |
| Talc | 36 |

The finely powdered ingredients are mixed thoroughly and then tableted by a slugging procedure.

Example 8.—Soft gelatin capsules

Five hundred one piece soft gelatin capsules for oral use each containing 100 mgs. of 11-(4-methyl-1-piperazinyl - dibenz[b,f][1,4]oxazepine are prepared by first dispersing 50 grams of the compound in sufficient corn oil to render the material capsulatable and then encapsulating in the usual manner.

I claim:
1. A method for controlling fertility in warm blooded female animals which comprises administering to said animals a contraceptively effective amount of a compound of the formula:

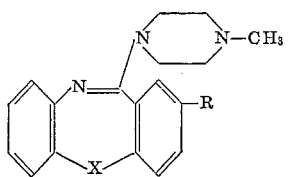

wherein R is selected from the group consisting of hydrogen and halogen and X is selected from the group consisting of oxygen and sulfur and a pharmaceutically acceptable carrier.

2. A method in accordance with claim 1 in which the active compound is 2-chloro-11-(4-methyl-1-piperazinyl) dibenz[b,f][1,4]oxazepine.

3. A method in accordance with claim 1 in which the active compound is 2-chloro-11-(4-methyl-1-piperazinyl) dibenzo[b,f][1,4]thiazepine.

4. A method in accordance with claim 1 in which the active compound is 11-(4-methyl-1-piperazinyl)-dibenz[b,f][1,4]oxazepine.

References Cited

Wander, Dr. A., S.A., 51 CAM–1402M, France, April 1964.

ALBERT T. MEYERS, *Primary Examiner.*

V. C. CLARKE, *Assistant Examiner.*